(12) United States Patent
Wood et al.

(10) Patent No.: US 7,730,714 B2
(45) Date of Patent: Jun. 8, 2010

(54) TURBOFAN GAS TURBINE ENGINE WITH VARIABLE FAN OUTLET GUIDE VANES

(75) Inventors: Peter John Wood, Loveland, OH (US); Ruby Lasandra Zenon, Sharonville, OH (US); Donald George LaChapelle, Cincinnati, OH (US); Mark Joseph Mielke, Blanchester, OH (US); Carl Grant, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1074 days.

(21) Appl. No.: 11/290,247

(22) Filed: Nov. 29, 2005

(65) Prior Publication Data

US 2007/0119150 A1     May 31, 2007

(51) Int. Cl.
    *F02K 3/02*     (2006.01)
    *F02K 1/38*     (2006.01)

(52) U.S. Cl. .................. 60/226.1; 60/262; 60/226.3

(58) Field of Classification Search ............ 60/226.1, 60/226.3, 262, 761
See application file for complete search history.

(56) References Cited

U.S. PATENT DOCUMENTS

| 3,632,224 | A | | 1/1972 | Wright et al. |
| 4,069,661 | A | | 1/1978 | Rundell et al. |
| 4,137,708 | A | | 2/1979 | Aspinwall et al. |
| 4,275,560 | A | * | 6/1981 | Wright et al. ............. 60/226.3 |
| 4,791,783 | A | * | 12/1988 | Neitzel ....................... 60/262 |
| 5,148,673 | A | | 9/1992 | Enderle |
| 5,311,735 | A | | 5/1994 | Orlando |
| 5,311,736 | A | * | 5/1994 | Lardellier ................. 60/226.3 |
| 5,402,638 | A | * | 4/1995 | Johnson ..................... 60/204 |
| 5,404,713 | A | * | 4/1995 | Johnson ..................... 60/204 |
| 5,694,768 | A | | 12/1997 | Johnson et al. |
| 5,794,432 | A | | 8/1998 | Dunbar et al. |
| 5,806,303 | A | | 9/1998 | Johnson |
| 5,809,772 | A | | 9/1998 | Giffin, III et al. |
| 5,867,980 | A | | 2/1999 | Bartos |
| 6,045,325 | A | | 4/2000 | Horvath et al. |
| 6,438,941 | B1 | | 8/2002 | Elliott et al. |
| 6,619,916 | B1 | | 9/2003 | Capozzi et al. |
| 6,662,546 | B1 | | 12/2003 | Giffin, III |
| 6,901,739 | B2 | * | 6/2005 | Christopherson .......... 60/226.3 |
| 6,931,858 | B2 | | 8/2005 | Venkataramani et al. |
| 7,246,484 | B2 | * | 7/2007 | Giffin et al. ................ 60/268 |

(Continued)

*Primary Examiner*—Michael Cuff
*Assistant Examiner*—Gerald L Sung
(74) *Attorney, Agent, or Firm*—William Scott Andes; Steven J. Rosen

(57) ABSTRACT

A turbofan gas turbine engine includes a forward fan section with a row of fan rotor blades, a core engine, and a fan bypass duct downstream of the forward fan section and radially outwardly of the core engine. The forward fan section has only a single stage of variable fan guide vanes which are variable fan outlet guide vanes downstream of the forward fan rotor blades. An exemplary embodiment of the engine includes an afterburner downstream of the fan bypass duct between the core engine and an exhaust nozzle. The variable fan outlet guide vanes are operable to pivot from a nominal OGV position at take-off to an open OGV position at a high flight Mach Number which may be in a range of between about 2.5-4+. Struts extend radially across a radially inwardly curved portion of a flowpath of the engine between the forward fan section and the core engine.

33 Claims, 5 Drawing Sheets

U.S. PATENT DOCUMENTS

| | | |
|---|---|---|
| 2002/0148216 A1 | 10/2002 | Brault et al. |
| 2005/0072158 A1 | 4/2005 | Christopherson |
| 2005/0081509 A1 * | 4/2005 | Johnson ..................... 60/226.1 |
| 2006/0242941 A1 * | 11/2006 | Johnson ..................... 60/226.1 |

* cited by examiner

TURBOFAN GAS TURBINE ENGINE WITH VARIABLE FAN OUTLET GUIDE VANES

The Government has rights to this invention pursuant to Contract No. NAS3-01135 awarded by the NASA.

BACKGROUND OF THE INVENTION

Field of the Invention

This invention relates to turbofan gas turbine engines and, more particularly, to such engines having guide vanes in the front fan section of the engine.

Turbofan gas turbine engines with multiple bypasses and having variable cycle capability are being developed for improved speed and power. One particular application is for aircraft-like vehicles for space-launch operations. Such gas turbine engines are designed to accelerate the vehicle to high flight mach numbers (Mach 4+) at which point scramjet propulsion systems take over. It is highly desirable have a gas turbine engine that meets the broad range of operating conditions for such an application. The fan has to operate at a high fan pressure ratio at take-off and be windmilled at high flight mach numbers.

It is desirable to reduce frontal area of the engine, reduce weight of the engine, and minimize or eliminate airflow interruption going into the fan. The fan has to operate at a high fan pressure ratio at take-off. It is under these conditions where fan rotor and outlet guide vanes (OGVs) are most heavily loaded aerodynamically. An engine and fan section are needed to operate and operate efficiently at these conditions so as to be able to pass a required airflow through the fan stage into a ramburner to create the required thrust. For take-off operating conditions, the fan OGV has to be designed with high solidity and high loading, while at high flight mach numbers, the fan has to be windmilled. These two requirements have conflicting fan OGV designs. This approach results in an OGV design that at the high flight Mach numbers causes the OGV to operate choked which limits the amount of flow to the ramburner and hence lowers the amount of thrust that can be produced.

Thus, it is highly desirable to have a gas turbine engine that can operate from take-off to high mach number conditions including in ramburner mode without choking the OGV and being able to windmill the fan in ramburner mode and yet minimize weight, fan inlet frontal area, and fan inlet airflow interruption.

SUMMARY OF THE INVENTION

A turbofan gas turbine engine includes a forward fan section with at least one row of circumferentially spaced apart longitudinally forward fan rotor blades and a core engine located aft and downstream of the forward fan section. The core engine includes in downstream serial flow relationship a core compressor, a core combustor, and a high pressure turbine drivingly connected to the core compressor by a core engine shaft. A fan bypass duct located downstream of the forward fan section is disposed radially outwardly of the core engine. The forward fan section has only a single stage of variable fan guide vanes and the fan guide vanes are variable fan outlet guide vanes located downstream or aft of and adjacent to the forward fan rotor blades.

An exemplary embodiment of the turbofan gas turbine engine includes an exhaust duct downstream of and in fluid communication with the fan bypass duct and a low pressure turbine located aft and downstream of the core engine and drivingly connected to the forward fan rotor blades by a low pressure shaft. An exhaust nozzle is disposed at a downstream end of the exhaust duct and an afterburner is disposed in the exhaust duct between the low pressure turbine and the exhaust nozzle. Struts may extend radially across a radially inwardly curved portion of a transition section of a flowpath of the engine extending axially between the forward fan section and the core engine. A forward variable area bypass injector may be located at an inlet to the fan bypass duct and a rear variable area bypass injector may be located at a fan bypass duct outlet from the fan bypass duct. The variable fan outlet guide vanes may be operable to pivot from a nominal OGV position at take-off to an open OGV position at a high flight Mach Number and the high flight Mach Number may be in a range of between about 2.5-4+. Applications are contemplated where the range may extend up to about a flight Mach Number equal to 4.9.

Another exemplary embodiment of the turbofan gas turbine engine has two inlets to the fan bypass duct, radially outer and inner inlets. An inner inlet duct extends from the inner inlet to the fan bypass duct and a supercharger is disposed in the inlet duct. The supercharger may include radially outwardly extending blade tips of rotor blades of the core driven fan.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
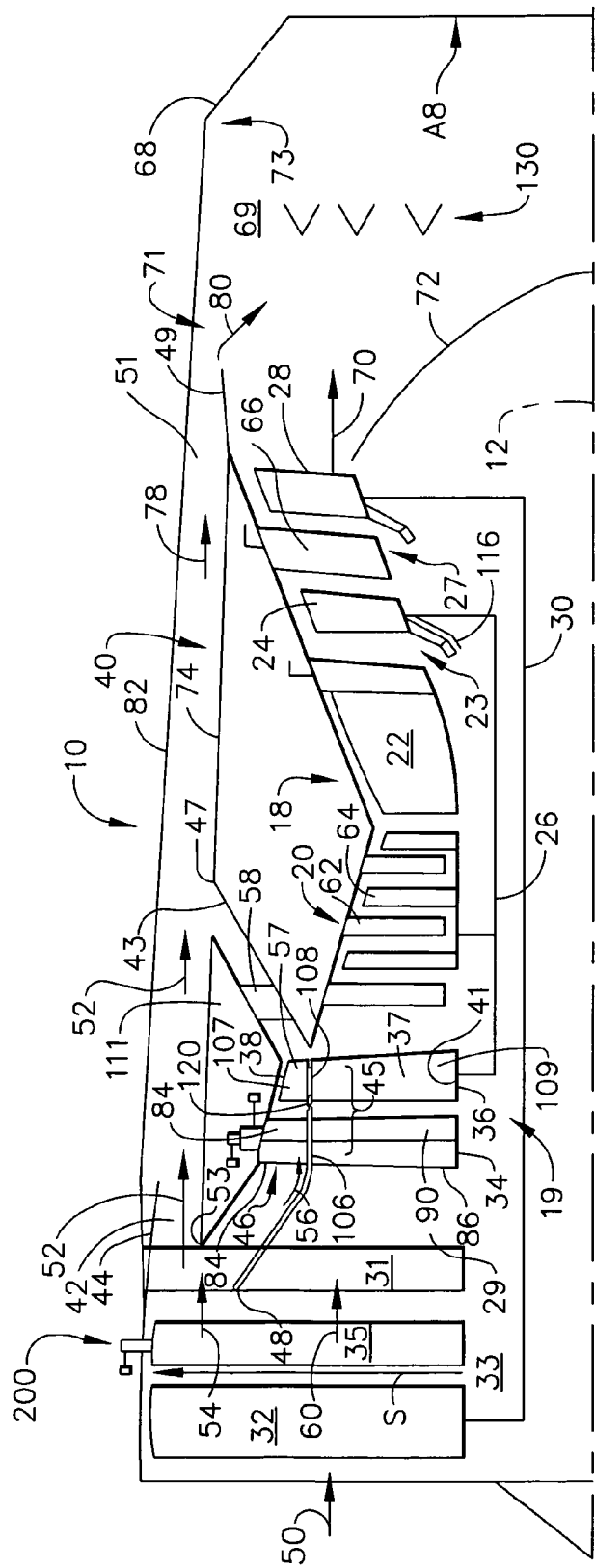
FIG. 1 is a schematical cross-sectional view illustration of a aircraft variable cycle gas turbine engine with no fan inlet guide vane and a variable fan outlet guide vane.

Illustrated in FIG. 1 is an exemplary turbofan gas turbine engine 10 capable of operating in a fanjet, turbojet, and ramjet modes, or cycles from take-off up through about Mach 4 or higher (4+). Applications are contemplated where the range may extend up to about a flight Mach Number equal to 4.9. Disposed about a longitudinally extending axis or centerline 12 of the engine 10 is a forward fan section 33 and further downstream a core engine 18 (also called a gas generator). The core engine 18 includes, in a serial downstream axial flow relationship, an aft or core driven fan (CDF) 19, a high pressure compressor 20, a core combustor 22, and a high pressure turbine (HPT) 23 having a row of high pressure turbine blades 24. High pressure compressor blades 64 of the high pressure compressor 20 and the CDF 19 are fixedly interconnected in driving engagement to the high pressure turbine blades 24 by a larger diameter annular core engine shaft 26 which is disposed coaxially about the centerline 12 of the engine 10 forming a high pressure spool.

Pressurized air from the high pressure compressor 20 is mixed with fuel in the combustor 22 and ignited, thereby, generating combustion gases. Some work is extracted from these gases by the high pressure turbine blades 24 which drives the high pressure compressor 20. The combustion gases are discharged from the core engine 18 into a low pressure turbine (LPT) 27 having a row of low pressure turbine rotor blades 28. The low pressure turbine rotor blades 28 are fixedly attached to a smaller diameter annular low pressure shaft 30 disposed coaxially about the centerline 12 of the engine 10 within the core engine shaft 26 and drivingly attached to a row of circumferentially spaced apart longitudinally forward fan rotor blades 32 of the forward fan section 33, thus, forming a low pressure spool.

The forward fan section 33 has only a single stage 200 of variable fan outlet guide vanes 35 extending radially across a flowpath 29 of the engine 10. The single stage of variable fan outlet guide vanes 35 is located downstream or aft of and adjacent to the forward fan rotor blades 32 and they are the only guide vanes in forward fan section 33. The term "adjacent" is used herein, for the purposes of this patent, to mean that there are no other rotor blade rows and/or stator vane rows between the named adjacent elements (i.e., between the forward row of fan rotor blades 32 and the variable fan outlet guide vanes 35). There are no inlet guide vanes at all, neither fixed or variable, which is large weight savings for the engine.

The engine 10 is operable to accelerate a vehicle to high flight mach numbers (Mach 4+) at which point scramjet propulsion systems take over. In order for the engine to effectively meet the broad range of operating conditions for such an application, the forward fan section 33 has to operate at a high fan pressure ratio at take-off and be windmilled at high flight mach numbers. The single guide vane stage forward fan section 33 with only a single row or stage of variable fan outlet guide vanes 35 provides this capability.

The core engine shaft 26 also rotates a longitudinally aft row of circumferentially spaced apart core driven or aft fan rotor blades 36 having generally radially outwardly extending blade tips 38. The aft fan rotor blades 36 are disposed longitudinally aft of the more longitudinally forward row of forward fan rotor blades 32. A row of circumferentially spaced-apart aft fan stator vanes 34 is disposed longitudinally between the rows of the forward and aft fan rotor blades 32 and 36, respectively, and longitudinally adjacent and in direct serial flow relationship with the row of the aft fan rotor blades 36.

A fan bypass duct 40 radially located between an engine inner casing 74 and an engine outer casing 82 has a radially outer inlet 42 disposed longitudinally between the forward fan section 33 and the aft or core driven fan 19. The outer inlet 42 includes a forward variable area bypass injector (VABI) exemplified by selector valve doors 44. A radially inner inlet 46 to the fan bypass duct 40 is disposed longitudinally between the forward fan section 33 and the aft or core driven fan 19 and radially inwardly of the outer inlet 42. An annular radially outer flow splitter 53 disposed between the radially outer and inner inlets 42 and 46. The radially outer and inner inlets 42 and 46 provide two parallel bypass flowpaths, separated by the outer flow splitter 53, into the fan bypass duct 40 from the forward fan. An inner inlet duct 43 extends from the inner inlet 46 to an inner inlet duct outlet 47 to the fan bypass duct 40 placing the inner inlet 46 in fluid communication with the fan bypass duct 40. The inner inlet 46 includes an annular duct wall 45 with a radially inner flow splitter 48.

The annular duct wall 45 includes a rotatable portion 108 or a shroud that is disposed radially between radially outer blade tip portions 107 and radially inner blade hub portions 109, respectively, of blade airfoils 37 of the aft fan rotor blades 36. The blade airfoil 37 extends from a blade base 41 to the blade tip 38 and the rotatable portion 108 is located at a location along a span S of the airfoil near the blade tip. The annular duct wall 45 also includes a non-rotatable portion 106 that is disposed between radially outer variable angle vanes 84 and radially inner variable angle vanes 86 which at least in part form the aft fan stator vanes 34. A fan bypass duct outlet 51 is disposed longitudinally aft and downstream of the outer and inner inlets 42 and 46 and includes a rear variable area bypass injector (VABI) exemplified by rear doors 49.

The engine or fan airflow 50 passes through the forward row of fan blades 32 and is then split into a core airflow portion 60 and bypass flow 54 by the radially inner flow splitter 48 at a forward end of the non-rotatable portion 106 supported by struts 31 extending radially across the flowpath 29. The bypass flow 54 includes a radially outer bypass airflow portion 52 which passes through the outer inlet 42 of the fan bypass duct 40 and a radially inner bypass airflow portion 56 which passes through the inner inlet 46 of the fan bypass duct 40, depending on the engine's operation. The blade tip 38 functions as a supercharger 57 that supercharges or further compresses the inner bypass airflow portion 56 of the bypass flow 54 which passes through the radially inner inlet 46 to the fan bypass duct 40. At high power, the outer bypass airflow portion 52 is substantially zero and the inner bypass airflow portion 56 is at or near maximum. At part power as the inner bypass airflow portion 56 is decreased and the outer bypass airflow portion 52 increases in more or less direct proportion. When the front selector valve door 44 is closed, the fan airflow 50 is split between the core airflow portion 60 passing through the row of aft fan stator vanes 34 and the more aft row of fan blades 36 and the inner bypass airflow portion 56. Note that the supercharger 57 disclosed herein is driven by the high pressure turbine 23 of the core engine 18 and that other superchargers in the radially inner inlet 46 to the fan bypass duct 40 driven by a low pressure turbine have been disclosed.

The inner bypass airflow portion 56 passes through the inner inlet 46 and past the outer variable angle vanes 84 and the blade tip portions 107 together which provide a supercharger means for compressing the inner bypass airflow portion 56 in the inner inlet duct 43. The blade tip portions 107 compress or supercharge the inner bypass airflow portion 56, and the outer variable angle vanes 84 provide control together, thus, providing variable and controllable supercharging of the inner bypass airflow portion 56, which under certain operating conditions, may be essentially all of the bypass flow passing around the core engine 18 through the fan bypass duct 40 when the selector valve door 44 is in a fully closed position. A row of bypass stator vanes 58 are disposed in the inner inlet duct 43 to deswirl the inner bypass airflow portion 56 in the inner inlet duct 43 before the inner bypass airflow portion 56 is discharged into the fan bypass duct 40 to mix with the outer bypass airflow portion 52.

The core airflow portion 60, in serial flow, passes through the high pressure compressor stator vanes 62 and the high pressure compressor blades 64 of the high pressure compressor 20; the combustor 22; the row of high pressure turbine blades 24; a row of low pressure turbine stator vanes 66; and the row of low pressure turbine blades 28. The core airflow portion 60 is discharged from the low pressure turbine 27 past the low pressure turbine rotor blades 28 between the engine inner casing 74 and a centerbody 72 at which point it is referred to as a core discharge airflow 70. A total bypass airflow 78 including the outer and inner bypass airflow portions 52 and 56 combined flows through the fan bypass duct 40 to the VABI rear doors 49. During turbofan and ram operation of the engine 10, most of the total bypass airflow 78 is injected through the rear VABI into an upstream end 71 of an exhaust duct 69 as bypass discharge flow 80 and is mixed with the core discharge airflow 70.

An afterburner 130 is located aft and downstream of the core engine 18 in the vicinity of the upstream end 71 of the exhaust duct 69 and is operable to provide fuel for combustion with the mixed core discharge airflow 70 and the bypass discharge flow 80 in the exhaust duct 69 during thrust augmentation and ram mode operation of the engine 10. The afterburner 130 provides virtually all of the fuel and ignition for combustion in the ram operating mode of the engine 10. A variable throat area A8 exhaust nozzle 68 is located downstream of the afterburner 130 at a downstream end 73 of the exhaust duct 69.

Figure 2:
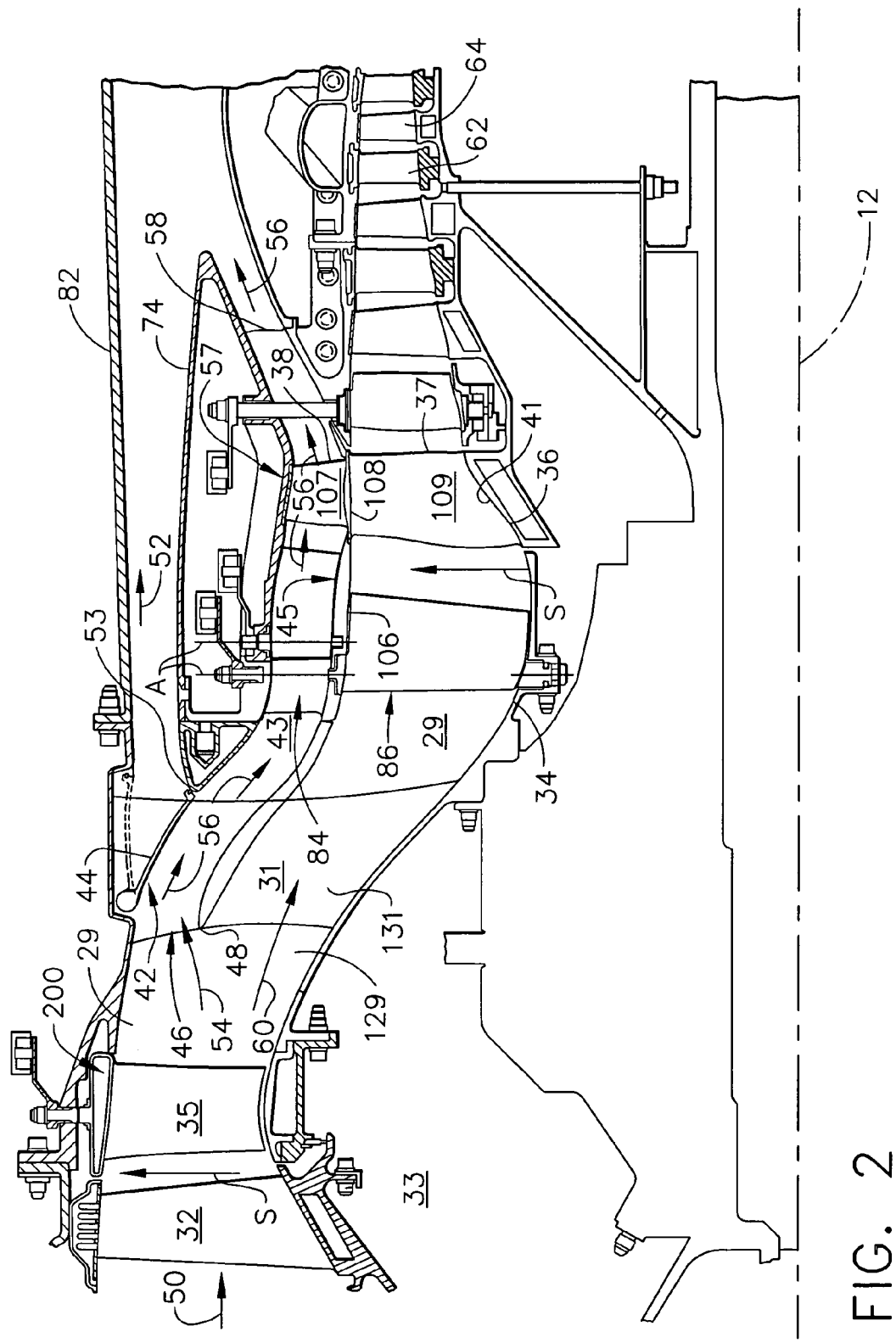
FIG. 2 is a more detailed cross-sectional view illustration of a fan section in the engine illustrated in FIG. 1.

Referring to FIG. 2, the flowpath 29 is annular and has a transition section 129 extending axially between the forward fan section 33 and the core engine 18. A portion 131 of the transition section 129 is radially inwardly curved in the axially aftwardly or downstream direction. The transition section 129 is sometimes referred to as a gooseneck. The struts 31 extend radially across the radially inwardly curved portion 131 of the transition section 129 of the flowpath 29. The variable fan outlet guide vanes 35 are operable to pivot as illustrated by nominal and open OGV positions as illustrated in FIG. 3.

Figure 3:
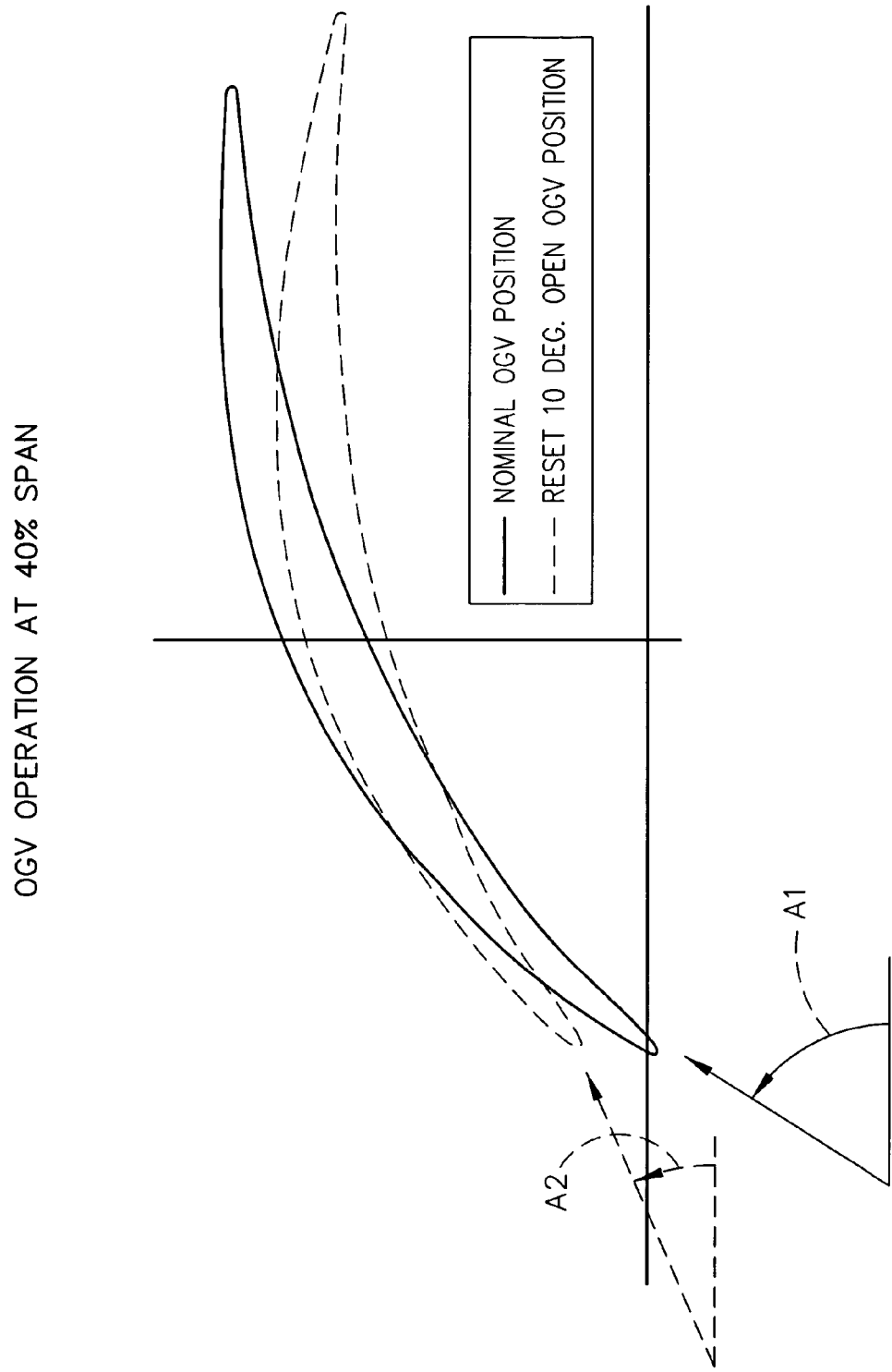
FIG. 3 is a schematical cross-sectional view illustration taken through the variable fan outlet guide vane illustrated in FIG. 2 illustrating nominal and open positions of the variable outlet guide vanes.

The nominal OGV position is denoted by a solid line and the open OGV position is denoted by a broken line in FIG. 3. The nominal OGV position is chosen to provide about 5 degrees of swirl coming out of the variable fan outlet guide vanes 35 which reduces loading of the variable fan outlet guide vanes 35. The variable fan outlet guide vanes 35 have high solidity for better operability at take-off. The open OGV position is chosen to avoid choking of the variable fan outlet guide vanes 35 at high flight Mach Numbers which would limit the amount of airflow to a ram burner, illustrated herein as a afterburner 130 in FIG. 1 and, hence, lower the amount of thrust that can be produced.

Figure 4:
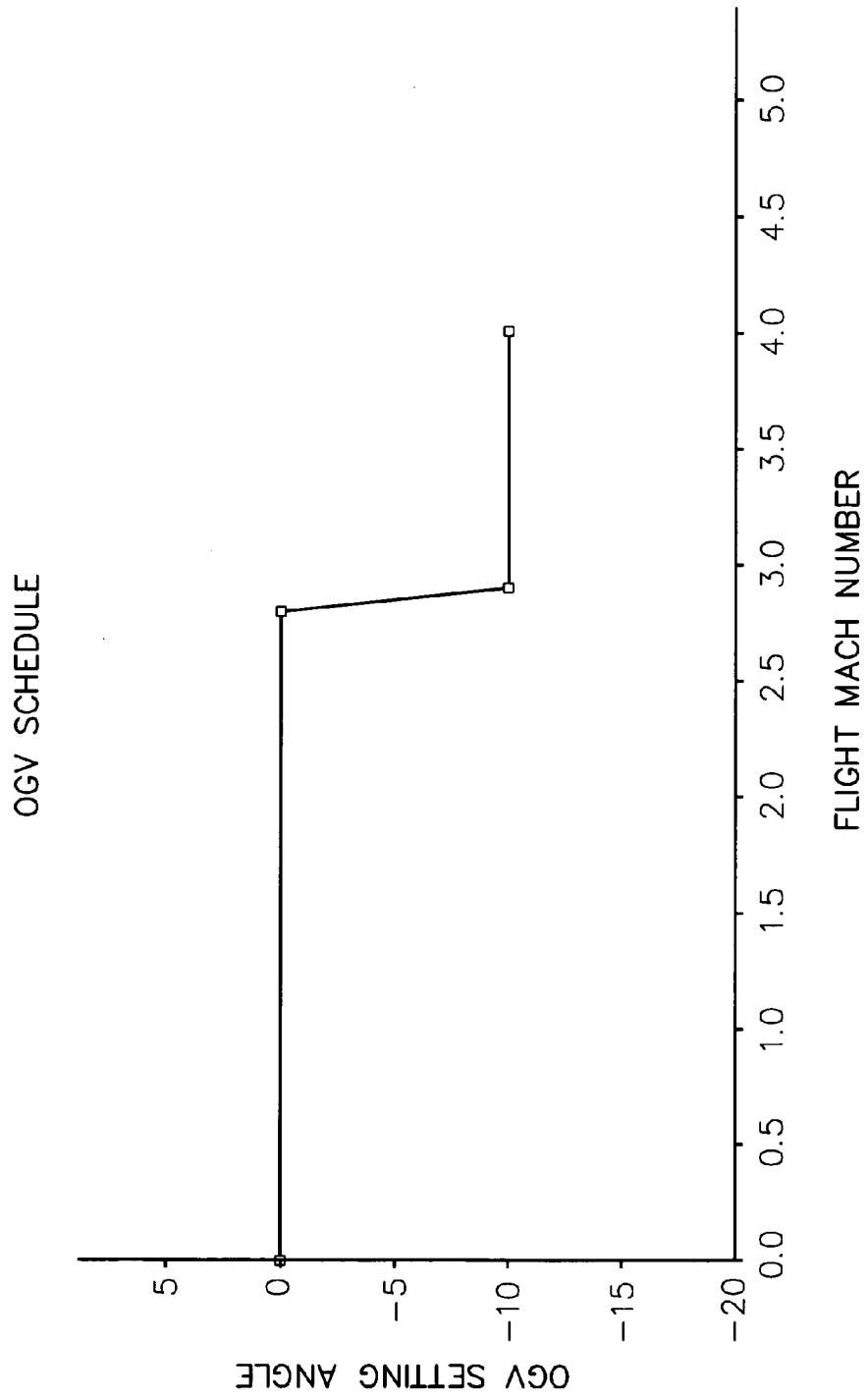
FIG. 4 is a graphical illustration of an exemplary operation of the variable fan outlet guide vane illustrated in FIG. 3.

The variable fan outlet guide vanes 35 are designed to pivot 10 degrees between the nominal and open OGV positions to accommodate first and second swirl angles A1 and A2, respectively, as illustrated in FIG. 4. The first and second swirl angles A1 and A2 are angles between the centerline 12 and flow vectors V1 and V2 at leading edges LE of the variable fan outlet guide vanes 35. In the exemplary embodiment illustrated herein, the first and second swirl angles A1 and A2 are 51 degrees and 24 degrees respectively at 40% span of the variable fan outlet guide vanes 35 at take-off and flight Mach Number equal to 3.3. For a particular design, the variable fan outlet guide vanes 35 are set at the nominal setting which is designated at 0 degrees and then reset at vehicle flight mach number equal to about 2.9 to the open setting which is a change of −10 degrees as illustrated in FIG. 4. The nominal and open OGV positions are designed to produce about + and −5 degrees of swirl respectively coming out of the variable fan outlet guide vanes 35 to ensure axial struts 31 downstream in the gooseneck or transition section 129 do not stall due to incidence effects.

Figure 5:
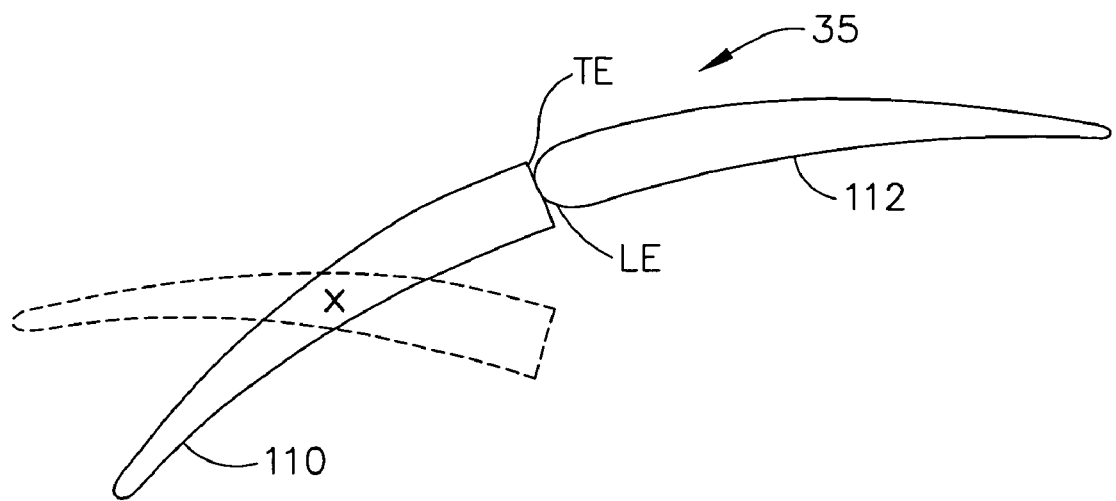
FIG. 5 is an illustration of a first alternative embodiment of the variable fan outlet guide vane having a pivotal forward section with a trailing edge designed to seal flush against a leading edge of a fixed aft section of the variable fan outlet guide vane.
Figure 6:
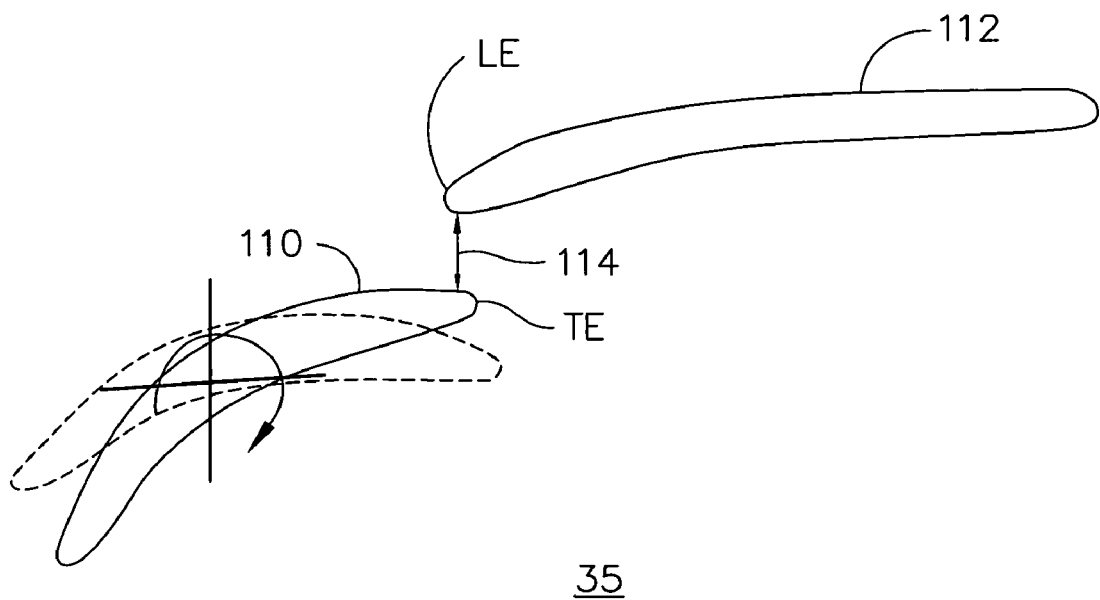
FIG. 6 is an illustration of a second alternative embodiment of the variable fan outlet guide vane having a gap between a trailing edge of a pivotal forward section and a leading edge of a fixed aft section of the variable fan outlet guide vane.

Each of the variable fan outlet guide vanes 35 illustrated in FIGS. 1 and 2 pivot in its entirety between the nominal and open OGV positions. Two alternative embodiments of the variable fan outlet guide vanes 35 are illustrated in FIGS. 5 and 6 in cross-section at the 40% span of the variable fan outlet guide vanes 35. Each of these variable fan outlet guide vanes 35 has a pivotal forward section 110 and a fixed aft section 112. The nominal and the open OGV positions of the variable fan outlet guide vanes 35 are denoted by solid and broken lines respectively in FIGS. 5 and 6. A trailing edge TE of the pivotal forward section 110 is designed to seal flush against a leading edge LE of the fixed aft section 112 so that no leakage can get through in the embodiment of the variable fan outlet guide vanes 35 illustrated in FIG. 5.

A gap 114 is between the trailing edge TE of the pivotal forward section 110 and the leading edge LE of the fixed aft section 112 in the embodiment of the variable fan outlet guide vanes 35 illustrated in FIG. 6. When the pivotal forward section 110 is closed, the nominal OGV position of the variable fan outlet guide vanes 35 denoted by a solid line, the forward and aft sections 110 and 112, respectively, do not come together and a wake off the pivotal forward section 110 is directed slightly below on a pressure side 116 of the aft section 112. When the pivotal forward section 110 is opened, the open OGV position of the variable fan outlet guide vanes 35 denoted by a broken line, the forward and aft sections 110 and 112, respectively, are further apart, the gap 114 is larger and the wake off the pivotal forward section 110 is directed further away below and downstream on the pressure side 116 of the aft section 112.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A turbofan gas turbine engine comprising:
   a forward fan section including at least one row of circumferentially spaced apart longitudinally forward fan rotor blades;
   a core engine located aft and downstream of the forward fan section and including in downstream serial flow relationship a core compressor, a core combustor, and a high pressure turbine drivingly connected to the core compressor by a core engine shaft;
   a fan bypass duct located downstream of the forward fan section and disposed radially outwardly of the core engine;
   the forward fan section located axially forward and upstream of a radially outer inlet of the fan bypass duct;
   an exhaust duct downstream of and in fluid communication with the core engine;
   a fan bypass duct outlet from the fan bypass duct to the exhaust duct downstream of the core engine; and
   the forward fan section having only a single stage of fan guide vanes and the fan guide vanes being variable fan outlet guide vanes located downstream of and adjacent to the forward fan rotor blades, for adjusting the flow into the fan duct.

2. A turbofan gas turbine engine as claimed in claim 1 further comprising:
   a low pressure turbine located aft and downstream of the core engine and drivingly connected to the forward fan rotor blades by a low pressure shaft,
   an exhaust nozzle disposed at a downstream end of the exhaust duct, and an afterburner disposed in the exhaust duct between the low pressure turbine and the exhaust nozzle.

3. A turbofan gas turbine engine as claimed in claim 2 further comprising:
a flowpath of the engine,
a transition section of the flowpath extending axially between the forward fan section and the core engine, and
struts extending radially across a radially inwardly curved portion of the transition section.

4. A turbofan gas turbine engine as claimed in claim 3 further comprising a forward variable area bypass injector at an inlet to the fan bypass duct and a rear variable area bypass injector at the fan bypass duct outlet from the fan bypass duct.

5. A turbofan gas turbine engine as claimed in claim 4 further comprising the variable fan outlet guide vanes being operable to pivot from a nominal outlet guide vane position at take-off to an open outlet guide vane position at a high flight Mach Number.

6. A turbofan gas turbine engine as claimed in claim 5 wherein the high flight Mach Number is in a range of between about 2.5-4.9.

7. A turbofan gas turbine engine as claimed in claim 2 further comprising a forward variable area bypass injector at an inlet to the fan bypass duct and a rear variable area bypass injector at a fan bypass duct outlet from the fan bypass duct.

8. A turbofan gas turbine engine as claimed in claim 7 further comprising the variable fan outlet guide vanes being operable to pivot from a nominal outlet guide vane position at take-off to an open outlet guide vane position at a high flight Mach Number.

9. A turbofan gas turbine engine as claimed in claim 8 wherein the high flight Mach Number is in a range of between about 2.5-4.9.

10. A turbofan gas turbine engine as claimed in claim 2 further comprising the variable fan outlet guide vanes being operable to pivot from a nominal outlet guide vane position at take-off to an open outlet guide vane position at a high flight Mach Number.

11. A turbofan gas turbine engine as claimed in claim 1 further comprising the variable fan outlet guide vanes being operable to pivot from a nominal outlet guide vane position at take-off to an open outlet guide vane position at a high flight Mach Number.

12. A turbofan gas turbine engine as claimed in claim 11 wherein the high flight Mach Number is in a range of between about 2.5-4.9.

13. A turbofan gas turbine engine as claimed in claim 1 further comprising each of the variable fan outlet guide vanes having a pivotal forward section and a fixed aft section.

14. A turbofan gas turbine engine as claimed in claim 13 further comprising:
an exhaust duct downstream of and in fluid communication with the fan bypass duct and a low pressure turbine located aft and downstream of the core engine and drivingly connected to the forward fan rotor blades by a low pressure shaft,
an exhaust nozzle disposed at a downstream end of the exhaust duct, and
an afterburner disposed in the exhaust duct between the low pressure turbine and the exhaust nozzle.

15. A turbofan gas turbine engine as claimed in claim 14 further comprising:
a flowpath of the engine,
a transition section of the flowpath extending axially between the forward fan section and the core engine, and
struts extending radially across a radially inwardly curved portion of the transition section.

16. A turbofan gas turbine engine as claimed in claim 15 further comprising a forward variable area bypass injector at an inlet to the fan bypass duct and a rear variable area bypass injector at a fan bypass duct outlet from the fan bypass duct.

17. A turbofan gas turbine engine as claimed in claim 16 further comprising the variable fan outlet guide vanes being operable to pivot from a nominal outlet guide vane position at take-off to an open outlet guide vane position at a high flight Mach Number.

18. A turbofan gas turbine engine as claimed in claim 17 wherein the high flight Mach Number is in a range of between about 2.5-4.9.

19. A turbofan gas turbine engine comprising:
a forward fan section including at least one row of circumferentially spaced apart longitudinally forward fan rotor blades;
a core engine located aft and downstream of the forward fan section and comprising in downstream serial flow relationship an aft core driven fan, a compressor, a core combustor, and a high pressure turbine drivingly connected to the core driven fan and the core compressor by a core engine shaft;
a low pressure turbine located aft and downstream of the core engine and drivingly connected to the forward fan rotor blades by a low pressure shaft;
a fan bypass duct downstream of the forward fan section and disposed radially outwardly of the core engine;
the forward fan section located axially forward and upstream of a radially outer inlet of the fan bypass duct;
an exhaust duct downstream of and in fluid communication with the fan bypass duct and the low pressure turbine;
the fan bypass duct including radially outer and inner inlets from the forward fan section to the fan bypass duct;
an inner inlet duct extending from the inner inlet to the fan bypass duct and having a supercharger disposed in the inlet duct; and
the forward fan section having only a single stage of fan guide vanes and the fan guide vanes being variable fan outlet guide vanes located downstream of and adjacent to the forward fan rotor blades and axially between the forward fan rotor blades and the fan bypass duct for adjusting the flow into the fan duct.

20. A turbofan gas turbine engine as claimed in claim 19 further comprising an exhaust nozzle disposed at a downstream end of the exhaust duct and an afterburner disposed in the exhaust duct between the low pressure turbine and the exhaust nozzle.

21. A turbofan gas turbine engine as claimed in claim 20 further comprising:
a flowpath of the engine,
a transition section of the flowpath extending axially between the forward fan section and the core engine, and
struts extending radially across a radially inwardly curved portion of the transition section.

22. A turbofan gas turbine engine as claimed in claim 21 further comprising a forward variable area bypass injector at an inlet to the fan bypass duct and a rear variable area bypass injector at a fan bypass duct outlet from the fan bypass duct.

23. A turbofan gas turbine engine as claimed in claim 22 further comprising the variable fan outlet guide vanes being operable to pivot from a nominal outlet guide vane position at take-off to an open outlet guide vane position at a high flight Mach Number.

24. A turbofan gas turbine engine as claimed in claim 23 wherein the high flight Mach Number is in a range of between about 2.5-4.9.

25. A turbofan gas turbine engine as claimed in claim 20 further comprising the variable fan outlet guide vanes being operable to pivot from a nominal outlet guide vane position at take-off to an open outlet guide vane position at a high flight Mach Number.

26. A turbofan gas turbine engine as claimed in claim 19 further comprising the variable fan outlet guide vanes being operable to pivot from a nominal outlet guide vane position at take-off to an open outlet guide vane position at a high flight Mach Number.

27. A turbofan gas turbine engine as claimed in claim 26 wherein the high flight Mach Number is in a range of between about 2.5-4.9.

28. A turbofan gas turbine engine as claimed in claim 20 wherein the supercharger includes radially outwardly extending blade tips of rotor blades of the core driven fan.

29. A turbofan gas turbine engine as claimed in claim 28 further comprising:

a flowpath of the engine, a transition section of the flowpath extending axially between the forward fan section and the core engine, and struts extending radially across a radially inwardly curved portion of the transition section.

30. A turbofan gas turbine engine as claimed in claim 29 further comprising a forward variable area bypass injector at an inlet to the fan bypass duct and a rear variable area bypass injector at a fan bypass duct outlet from the fan bypass duct.

31. A turbofan gas turbine engine as claimed in claim 30 further comprising the variable fan outlet guide vanes being operable to pivot from a nominal outlet guide vane position at take-off to an open outlet guide vane position at a high flight Mach Number.

32. A turbofan gas turbine engine as claimed in claim 31 wherein the high flight Mach Number is in a range of between about 2.5-4.9.

33. A turbofan gas turbine engine as claimed in claim 32 further comprising each of the variable fan outlet guide vanes having a pivotal forward section and a fixed aft section.

* * * * *